US 8,819,375 B1

(12) United States Patent
Pruett et al.

(10) Patent No.: US 8,819,375 B1
(45) Date of Patent: Aug. 26, 2014

(54) METHOD FOR SELECTIVE DEFRAGMENTATION IN A DATA STORAGE DEVICE

(75) Inventors: David C. Pruett, Longmont, CO (US); Srinivas Neppalli, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 208 days.

(21) Appl. No.: 13/308,403

(22) Filed: Nov. 30, 2011

(51) Int. Cl.
G06F 13/00 (2006.01)
G06F 13/28 (2006.01)

(52) U.S. Cl.
USPC .................. 711/165; 711/E12.002; 707/693

(58) Field of Classification Search
USPC ........................ 711/165, E12.002; 707/693
See application file for complete search history.

(56) References Cited

U.S. PATENT DOCUMENTS

| | | |
|---|---|---|
| 5,530,850 A | 6/1996 | Ford et al. |
| 5,551,003 A | 8/1996 | Mattson et al. |
| 5,604,902 A | 2/1997 | Burkes et al. |
| 5,734,861 A | 3/1998 | Cohn et al. |
| 5,799,185 A | 8/1998 | Watanabe |
| 5,819,290 A | 10/1998 | Fujita |
| 5,819,310 A | 10/1998 | Vishlitzky et al. |
| 6,067,199 A | 5/2000 | Blumenau |
| 6,125,434 A | 9/2000 | Willard et al. |
| 6,324,631 B1 | 11/2001 | Kuiper |
| 6,430,663 B1 | 8/2002 | Ding |
| 6,493,160 B1 | 12/2002 | Schreck |
| 6,711,660 B1 | 3/2004 | Milne et al. |
| 6,854,022 B1 | 2/2005 | Thelin |
| 6,978,283 B1 | 12/2005 | Edwards et al. |
| 7,124,272 B1 | 10/2006 | Kennedy et al. |
| 7,146,525 B2 | 12/2006 | Han et al. |
| 7,149,822 B2 | 12/2006 | Edanami |
| 7,315,917 B2 | 1/2008 | Bennett et al. |
| 7,363,421 B2 | 4/2008 | Di Sena et al. |
| 7,373,477 B2 | 5/2008 | Takase et al. |
| 7,409,522 B1 * | 8/2008 | Fair et al. ........................ 711/170 |
| 7,424,498 B1 | 9/2008 | Patterson |
| 7,443,625 B2 | 10/2008 | Hamaguchi et al. |
| 7,447,836 B2 | 11/2008 | Zhang et al. |
| 7,516,355 B2 | 4/2009 | Noya et al. |
| 7,519,639 B2 | 4/2009 | Bacon et al. |
| 7,552,282 B1 | 6/2009 | Bermingham et al. |
| 7,567,995 B2 | 7/2009 | Maynard et al. |
| 7,593,975 B2 | 9/2009 | Edwards et al. |
| RE41,011 E | 11/2009 | Han et al. |
| 7,624,137 B2 | 11/2009 | Bacon et al. |
| 7,685,360 B1 | 3/2010 | Brunnett et al. |
| 7,707,166 B1 | 4/2010 | Patterson |
| 7,721,059 B2 | 5/2010 | Mylly et al. |

(Continued)

FOREIGN PATENT DOCUMENTS

WO   WO 99/10812 A1   3/1999

Primary Examiner — Edward Dudek, Jr.

(57) ABSTRACT

A data storage device is disclosed including a non-volatile media having a plurality of physical locations for storing user data, each physical location associated with a logical block address (LBA), a translation table having a plurality of entries, each entry having a mapping of one or more LBAs to a corresponding number of physical locations on the non-volatile media. The data storage device further includes control circuitry that divides the translation table into a plurality of segments, each segment including a group of entries corresponding to a range of LBAs, determines a first score for each segment using a first metric, and selects a segment for defragmentation by utilizing the first score for each segment.

28 Claims, 7 Drawing Sheets

(56) References Cited

U.S. PATENT DOCUMENTS

| | | |
|---|---|---|
| 7,783,682 B1 | 8/2010 | Patterson |
| 8,359,430 B1 | 1/2013 | Fair |
| 8,521,972 B1 | 8/2013 | Boyle et al. |
| 2002/0138694 A1 | 9/2002 | Isshiki |
| 2002/0188800 A1 | 12/2002 | Tomaszewski et al. |
| 2003/0051110 A1 | 3/2003 | Gaspard et al. |
| 2003/0101383 A1 | 5/2003 | Carlson |
| 2004/0179386 A1 | 9/2004 | Jun |
| 2004/0268079 A1 | 12/2004 | Riedle et al. |
| 2005/0021900 A1 | 1/2005 | Okuyama et al. |
| 2005/0071537 A1 | 3/2005 | New et al. |
| 2005/0216657 A1 | 9/2005 | Forrer, Jr. et al. |
| 2006/0020849 A1 | 1/2006 | Kim |
| 2006/0106981 A1 | 5/2006 | Khurshudov et al. |
| 2006/0155917 A1 | 7/2006 | Di Sena et al. |
| 2006/0212674 A1 | 9/2006 | Chung et al. |
| 2007/0027940 A1* | 2/2007 | Lutz et al. ................ 707/205 |
| 2007/0050390 A1 | 3/2007 | Maynard et al. |
| 2007/0198614 A1 | 8/2007 | Zhang et al. |
| 2007/0208790 A1 | 9/2007 | Reuter et al. |
| 2008/0010395 A1* | 1/2008 | Mylly et al. ............... 711/100 |
| 2008/0077762 A1 | 3/2008 | Scott et al. |
| 2008/0091872 A1 | 4/2008 | Bennett et al. |
| 2008/0263059 A1 | 10/2008 | Coca et al. |
| 2008/0263305 A1 | 10/2008 | Shu et al. |
| 2009/0049238 A1 | 2/2009 | Zhang et al. |
| 2009/0055450 A1 | 2/2009 | Biller |
| 2009/0094299 A1 | 4/2009 | Kim et al. |
| 2009/0164742 A1 | 6/2009 | Wach et al. |
| 2010/0153347 A1 | 6/2010 | Koester et al. |
| 2010/0287217 A1 | 11/2010 | Borchers et al. |
| 2010/0293354 A1* | 11/2010 | Perez et al. ............... 711/171 |
| 2011/0231623 A1 | 9/2011 | Goss et al. |
| 2011/0283049 A1 | 11/2011 | Kang et al. |
| 2012/0117322 A1* | 5/2012 | Satran et al. ............. 711/114 |
| 2012/0173832 A1 | 7/2012 | Post et al. |
| 2013/0107391 A1* | 5/2013 | Springberg et al. ......... 360/39 |

\* cited by examiner

FIG. 1C

TRANSLATION TABLE

| | |
|---|---|
| ENTRY 1 → | $(l_1, p_1, n_1)$ |
| ENTRY 2 → | $(l_2, p_2, n_2)$ |
| ENTRY 3 → | $(l_3, p_3, n_3)$ |
| ENTRY 4 → | $(l_4, p_4, n_4)$ |
| ENTRY 5 → | $(l_5, p_5, n_5)$ |
| ENTRY 6 → | $(l_6, p_6, n_6)$ |
| ENTRY 7 → | $(l_7, p_7, n_7)$ |
| ENTRY 8 → | $(l_8, p_8, n_8)$ |
| ENTRY 9 → | $(l_9, p_9, n_9)$ |
| ENTRY 10 → | $(l_{10}, p_{10}, n_{10})$ |
| ENTRY 11 → | $(l_{11}, p_{11}, n_{11})$ |
| ENTRY 12 → | $(l_{12}, p_{12}, n_{12})$ |
| ENTRY 13 → | $(l_{13}, p_{13}, n_{13})$ |
| ENTRY 14 → | $(l_{14}, p_{14}, n_{14})$ |
| ENTRY 15 → | $(l_{15}, p_{15}, n_{15})$ |
| ENTRY 16 → | $(l_{16}, p_{16}, n_{16})$ |
| ENTRY 17 → | $(l_{17}, p_{17}, n_{17})$ |
| ⋮ | ⋮ |
| ENTRY N → | $(l_N, p_N, n_N)$ |

SEGMENT 1
{LBA range = $LBA_a - LBA_b$, where $a \leq l_1 < (l_6 + n_6 - 1) \leq b$}

SEGMENT 2
{LBA range = $LBA_c - LBA_d$, where $c \leq l_7 < (l_{14} + n_{14} - 1) \leq d$}

SEGMENT 3
{LBA range = $LBA_e - LBA_f$, where $e \leq l_{15} < (l_N + n_N - 1) \leq f$}

METHOD FOR SELECTIVE DEFRAGMENTATION IN A DATA STORAGE DEVICE

BACKGROUND

Data storage devices, such as disk drives using shingled recording media and solid state drives, can use "logical block address (LBA) indirection" to store user data on non-volatile media, such as a disk surface or flash memory, wherein LBAs and associated data are not typically stored in the same physical location each time they are written. In a data storage device using LBA indirection, a host may write a logically sequential group of LBAs into a corresponding number of sequential physical locations on the non-volatile media. However, as the LBAs are rewritten by the host, they may end up in non-sequential physical locations. Thus, a group of LBAs that was once sequentially written onto the non-volatile media may become scattered at different locations on the media as they are rewritten. As a result, the non-volatile media will become increasingly fragmented over time, which can significantly degrade the read performance of the data storage device.

In addition, a data storage device that uses LBA indirection typically uses a translation table to keep track of LBAs and corresponding physical locations on the non-volatile media. As the non-volatile media becomes fragmented, the number of entries in the translation table increases, thereby undesirably increasing the amount of memory required to store the translation table.

To overcome the aforementioned problems associated with fragmentation of the non-volatile media, a defragmentation may be employed. In a defragmentation process, a range of LBAs may be selected, read from the non-volatile media (e.g., a shingled recording media), and rewritten as a sequential stream onto the non-volatile media. The above steps may be repeated for each LBA range on the non-volatile media. This process increases read performance of the non-volatile media and also reduces the size and required storage space of the translation table. However, the defragmentation process can be an expensive operation in that it can increase latency and reduce overall data storage device performance. Thus, it is important to perform the defragmentation process efficiently so as to minimize the aforementioned undesirable effects.

DETAILED DESCRIPTION

Figure 1A:
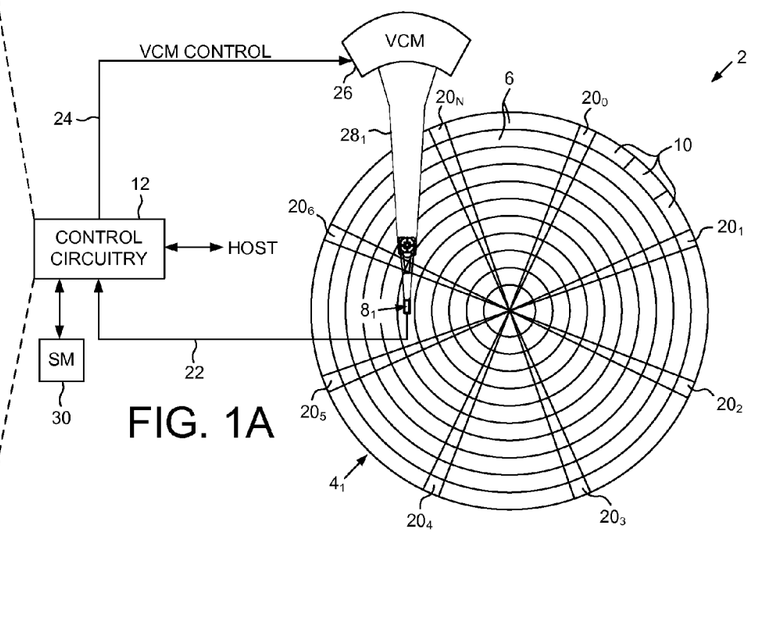
FIG. 1A shows a disk-based data storage device according to an embodiment of the present invention comprising a disk surface comprising a plurality of physical locations, a head actuated over the disk surface, a semiconductor memory (SM), and control circuitry, wherein LBA indirection is used to store user data in the physical locations on the disk surface.
Figure 1B:
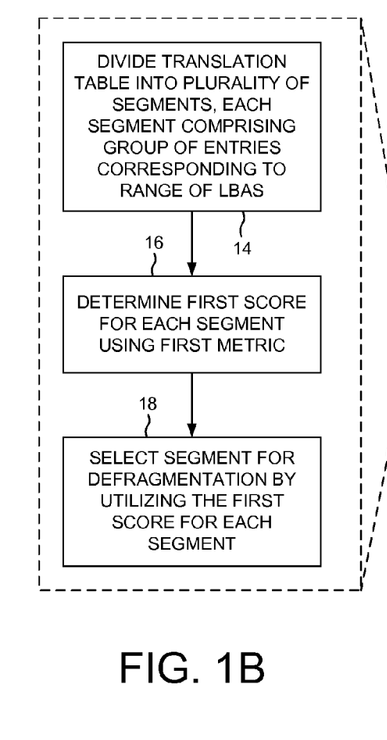
FIG. 1B is a flow diagram according to an embodiment of the present invention wherein a translation table is divided into a plurality of segments and a first score is determined for each segment and used for selecting a segment for defragmentation.

FIG. 1A shows a disk-drive based data storage device 2 according to an embodiment of the present invention comprising a disk surface $4_1$ having a plurality of data tracks 6, and a head $8_1$ actuated radially over the disk surface $4_1$ to write data to and read data from the disk surface $4_1$. Each data track 6 comprises a plurality of physical locations 10 which can be used by the host for reading and writing data. The data storage device 2 further comprises control circuitry 12 operable to execute the flow diagram of FIG. 1B. A translation table is divided into a plurality of segments, each segment comprising a group of entries corresponding to a range of logical block addresses (LBAs) (step 14). A first score is determined for each segment using a first metric (step 16), and a segment is selected for defragmentation by utilizing the first score for each segment (step 18).

Figure 1C:
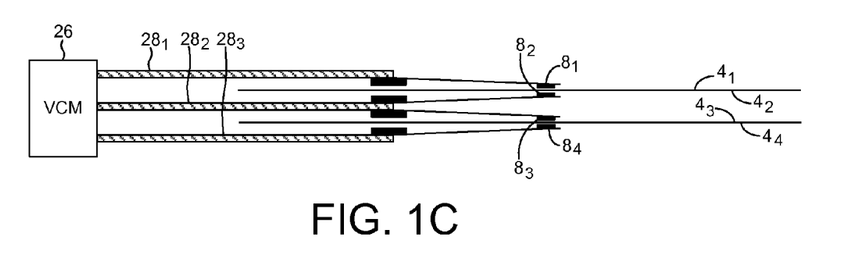
FIG. 1C shows an embodiment of the present invention wherein the disk-based data storage device comprises a plurality of heads actuated over respective disk surfaces.

In the embodiment of FIG. 1A, the disk surface $4_1$ further comprises a plurality of embedded servo sectors $20_0$-$20_N$ which define the plurality of data tracks 6. Each servo sector $20_i$ comprises head positioning information such as a track address for coarse positioning during seeks, and servo bursts for fine positioning while tracking the centerline for a target track during write/read operations. The control circuitry 12 processes a read signal 22 emanating from the head $8_1$ to demodulate the servo sectors into a position error signal (PES). The PES is filtered with a suitable compensation filter to generate a control signal 24 applied to a VCM 26 which rotates an actuator arm $28_1$ about a pivot in a direction that reduces the PES. In an embodiment shown in FIG. 1C, the data storage device 2 comprises a plurality of actuator arms $28_1$-$28_3$ which are rotated about the pivot by the VCM 26 and a plurality of heads $8_1$-$8_N$ actuated over respective disk surfaces $4_1$-$4_4$.

In the embodiment shown in FIG. 1A, the data storage device 2 further comprises a buffer, such as a semiconductor memory (SM) 30 communicatively coupled to the control circuitry 12. The SM 30 may serve as a cache for temporarily storing write data received from the host via a write command and read data requested by the host via a read command. In an embodiment of the invention, the SM 38 may also serve as a cache for temporarily storing data read from the disk surface $4_1$ during a defragmentation process. The SM 38 can be implemented, for example, using dynamic random access memory (DRAM), flash memory, or static random access memory (SRAM).

In addition, the SM 38 may provide storage for the translation table used by the control circuitry 12. The translation table provides a data structure for mapping the LBAs requested by the host into physical locations on a non-volatile media (e.g., the disk surface $4_1$). In an embodiment of the invention, LBAs are written on the disk surface $4_1$ using LBA indirection, wherein an LBA is generally stored in a different physical location on the disk surface $4_1$ each time it is written by the host.

In an embodiment of the invention using shingled magnetic recording, the data tracks 6 on the disk surface $4_1$ are written in a shingled manner such that each track is partially overwritten when an immediately contiguous track is written. In shingled magnetic recording, for example, LBAs from the host are recorded sequentially, resulting in LBA indirection. Since there is no fixed location on the disk surface $4_1$ for a given LBA, the control circuitry 12 maintains the translation table to keep track of the physical locations of the LBAs. For example, when a LBA is rewritten, a newer copy of that LBA will be written in a new location on the disk surface $4_1$, and the control circuitry 12 updates the translation table to reflect the latest physical location of that LBA.

Figure 1D:
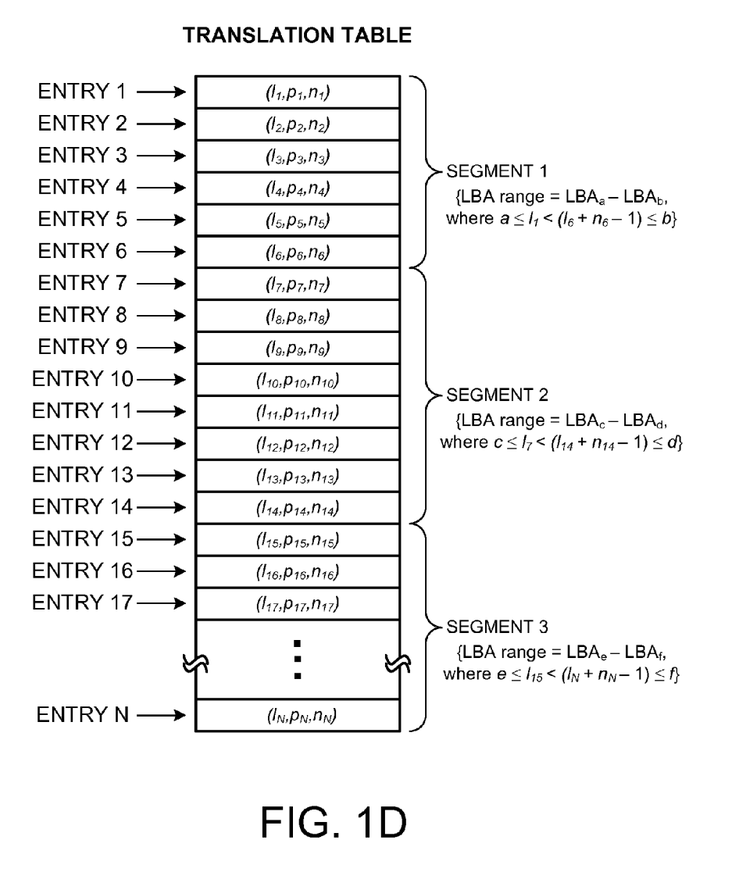
FIG. 1D shows a translation table according to an embodiment of the present invention comprising a plurality of entries, each entry mapping logical block addresses (LBAs) to corresponding physical locations on non-volatile media, and a plurality of segments, each segment comprising a number of entries and corresponding to a range of LBAs.

In the embodiment of the invention shown in FIG. 1D, a translation table comprises a plurality of entries 1-N, wherein each entry comprises a mapping of one or more LBAs to a corresponding number of physical locations on non-volatile media, such as the disk surface $4_1$ in the embodiment in FIG. 1A. The translation table in the embodiment in FIG. 1D is run length enabled to minimize storage space, wherein each entry may represent more than one LBA. In an embodiment of the invention, the translation table is stored in SM 30. In one embodiment, the translation table is temporarily stored in volatile memory while the data storage device is powered up and stored in non-volatile memory (e.g., a disk surface $4_1$) when the data storage device is powered down.

In the embodiment in FIG. 1D, each entry is designated by $(l_i, p_i, n_i)$, where $l_i$ refers to the starting LBA in the entry, $p_i$ refers to the corresponding starting physical location in the entry, and $n_i$ refers to the number of blocks that are logically and physically sequential in the entry, starting with $l_i$ and $p_i$. As shown in the embodiment in FIG. 1D, the translation table is divided into a plurality of segments, wherein each segment comprises a group of entries corresponding to a range of LBAs. For example, the translation table in FIG. 1D is divided into segments 1, 2, and 3, wherein segment 1 comprises entries 1-6, segment 2 comprises entries 7-14, and segment 3 comprises entries 15-N.

As shown in FIG. 1D, segment 1 corresponds to an LBA range extending from $LBA_a$ to $LBA_b$, where $a \leq l_1 < (l_6+n_6-1) \leq b$, segment 2 corresponds to an LBA range extending from $LBA_c$ to $LBA_d$, where $c \leq l_7 < (l_{14}+n_{14}-1) \leq d$, and segment 3 corresponds to an LBA range extending from $LBA_e$ to $LBA_f$, where $e \leq l_{15} < (l_N+n_N-1) \leq f$. The first LBA in a range may be less than the starting LBA in the first entry of a segment and the last LBA in the range may be greater than the last LBA in the last entry of the segment. For example, $LBA_a$ can be less than the starting LBA in the first entry of the first segment when there are one or more LBAs that have not been written by the host which have a lower address than the starting LBA in the first entry of the first segment. Similarly, $LBA_b$ can be greater than the last LBA in the last entry of the first segment when there are one or more LBAs that have not been written by the host which have a higher address than the last LBA in the last entry of the first segment.

A translation table, however, may consume significant memory resources, for example, of the SM 30, especially for larger capacity data store devices. Over time, the non-volatile media (e.g., a disk surface $4_1$) may become fragmented and, thus, the entries in the translation table become shorter, resulting in more entries and an increased translation table size. Also, as the non-volatile media becomes more fragmented, the data storage device's sequential read performance may decrease significantly.

The size of the translation table and read performance of the data storage device may be optimized, for example, by employing defragmentation. Defragmentation is a process wherein fragmented LBAs are read from non-volatile media (e.g., a disk surface $4_1$) and rewritten sequentially onto the non-volatile media to avoid fragmentation. In addition, the translation table is updated and optimized to reduce its required size. In embodiments of the present invention, various metrics (e.g., fragmentation, dispersion, and time metrics) are used, either singly or in combination, to select one of multiple segments of the translation table for defragmentation, wherein each segment corresponds to a range of LBAs on the non-volatile media (e.g., a disk surface $4_1$) of a data storage device (e.g., a disk drive). Fragmentation, dispersion, and time metrics are discussed in detail below.

Fragmentation Metrics

In an embodiment of the invention, a fragmentation metric depends only on the state of the translation table and does not attempt to take the actual geometry of a data storage device (e.g., a disk drive) into account. While this may be optimal for the translation table, it ignores any benefit to read performance in the data storage device.

In an embodiment of the invention, a translation table entry represents a sequence of LBAs that are both logically and physically sequential. The entry may represent from one to a predetermined maximum number of blocks. In one embodiment, gaps in the translation table are represented by a gap in logical addresses between two entries. A translation table entry can be described, for example, by (l, p, n), where l represents the starting logical address, p represents the starting physical address, and n represents the number of blocks that are logically and physically sequential, starting with (l, p).

In an embodiment of the invention, a segment comprises a group of entries corresponding to a range of LBAs. The range of LBAs may be represented, for example, by the expression:

$$(l,n)=\{(l_1,p_1,n_1),(l_2,p_2,n_2),\ldots(l_m,p_m,n_m)\}$$

where $l \leq l_i < l+n$ and $(\Sigma n_i) \leq n$. For example, the total length of all the entries may be less than the enclosing range when not all of the logical addresses in the range have physical addresses. Logical addresses that do not have physical addresses refer to logical addresses that have never been written by the host and, therefore, do not appear in the translation table.

In an embodiment, a first fragmentation metric ($\Delta_1$) indicates the number of entries, m, required to describe a range of LBAs (l, n), where $0 \leq m \leq n$. The first fragmentation metric is effective for comparing segments having logical ranges (i.e., ranges of LBAs) that have the same size, but not as effective when comparing segments corresponding to varying logical range sizes.

In an embodiment of the invention, a second fragmentation metric ($\Delta_2$) indicates a ratio of total number of LBAs per entry. For a given segment comprising a group of entries, a lower ratio indicates greater fragmentation. The second fragmentation metric may be represented, for example, by the expression:

$$\Delta_2 = \frac{1}{m}\sum_{i=1}^{m} n_i$$

where m represents the number of entries and $n_i$ represents the number of logically and physically sequential blocks.

Dispersion Metrics

In an embodiment of the invention, a dispersion metric is used to quantify the physical separation of logical addresses with the assumption that dispersion is proportional to the time it would take to read the corresponding data. As with fragmentation metrics, there is a correlation between read performance and translation table size.

Figure 2:
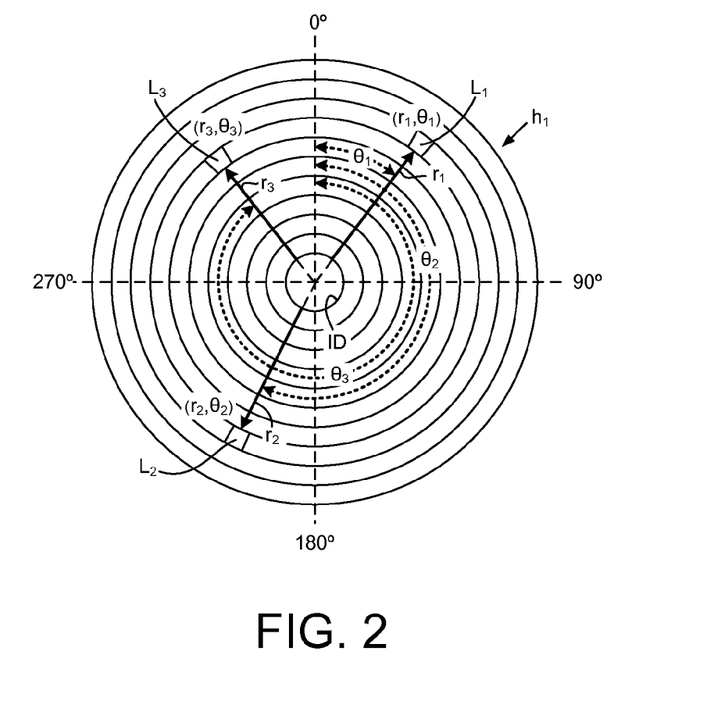
FIG. 2 shows a disk surface according to an embodiment of the present invention comprising a plurality of physical locations, each physical location represented by a cylindrical coordinate.

In an embodiment, physical addresses $p_i$, which correspond to physical locations on the non-volatile media (e.g., a disk surface 4), are represented by the translation table in a compact, integral addressing scheme referred to as "Shingled Absolute Block Address" (ShABA). A ShABA address may be converted to an actual physical location on a disk surface. For example, the physical location may be represented in cylindrical coordinates (h, r, $\theta$), where h represents the disk surface, r represents the radius in servo tracks, and $\theta$ represents the angular position. As shown in the embodiment of the invention shown in FIG. 2, for example, a disk surface $h_1$ comprises physical locations $L_1$, $L_2$, and $L_3$. As shown in FIG. 2, $L_1$, $L_2$, and $L_3$ are represented by respective cylindrical coordinates $(h_1, r_1, \theta_1)$, $(h_1, r_2, \theta_2)$, and $(h_1, r_3, \theta_3)$, where $r_1$, $r_2$, and $r_3$ represent the radiuses in servo tracks between the inner diameter (ID) of the disk surface $h_1$ and $L_1$, $L_2$, and $L_3$, and where $\theta_1$, $\theta_2$, $\theta_3$ represent the angular positions of $L_1$, $L_2$, and $L_3$ with respect to a 0° reference.

In one embodiment of the invention, a first dispersion metric ($\Delta_3$) indicates the variance in physical locations corresponding to each translation table entry in a segment (i.e., a group of entries corresponding to a range of LBAs). For the first dispersion metric, the physical distance between two physical addresses is assumed to be proportional to the difference between the two addresses' ShABA values. In an embodiment, this is calculated as the variance of the physical addresses in the logical address range, resulting in a first dispersion metric ($\Delta_3$):

$$\Delta_3 = \frac{1}{K}\sum_{i=1}^{m}\sum_{j=0}^{n_i-1}(p_i + j - \mu_{phy})^2$$

where $K = \sum_{i=1}^{m} n_i$ and $\mu_{phy} = \frac{1}{K}\sum_{i=1}^{m}\sum_{j=0}^{n_i-1}(p_i + j)$.

In an embodiment, a second dispersion metric ($\Delta_4$), which is more accurate than the first dispersion metric, performs the translation from ShABA address to physical address and determines the variance in the distance from a centroid (i.e., a geometric center). For the second dispersion metric, the head coordinate h is ignored, since head switching time (i.e., the time to switch from one head to another in an embodiment wherein the data storage device comprises a multi-headed disk drive) is considered to be negligible. Thus, for the second dispersion metric, the physical location may be represented by (r, $\theta$), where r represents the radius from the centroid, and $\theta$ represents the angular position. For example, the translation function can be represented by (r, $\theta$)=T($p_i$). The centroid can then be determined by:

$$(r_c, \theta_c) = \frac{1}{K}\sum_{i=1}^{m}\sum_{j=0}^{n-1}T(p_i + j) = \frac{1}{K}(r_k\cos\theta_k, r_k\sin\theta_k).$$

The distance function in cylindrical coordinates may be expressed as:

$$|(r_i,\theta_i)-(r_j,\theta_j)|=\sqrt{(r_i\cos\theta_i-r_j\cos\theta_j)^2+(r_i\sin\theta_i-r_j\sin\theta_j)^2}.$$

By combining the above expressions, the variance for the second dispersion metric ($\Delta_4$) may be expressed as:

$$\Delta_4 = \frac{1}{K}\sum_{K}(r_i\cos\theta_i - r_j\cos\theta_j)^2 + (r_i\sin\theta_i - r_j\sin\theta_j)^2.$$

In an embodiment, the second dispersion metric is substantially more computationally expensive than the first dispersion metric, with much of the additional cost being the translations from ShABA addresses to physical locations.

Time Metrics

In an embodiment of the invention, a time metric directly estimates the amount of time required to perform a logically sequential read of a logical range (l, n). In one embodiment, when logical blocks have never been written by the host, they are constructed as all-zero sectors and returned without any disk surface activity. For example, if (l, n) is completely unwritten, the time required to construct such data may be expressed as t=$nT_{df}$, where $T_{df}$ is the time required to fabricate one block.

When (l, n) is physically sequential, for example, a seek time and a rotational latency time are required to read the logical range. In one embodiment, t=$T_{sk}+T_{rl}+nT_d$, where $T_{sk}$ represents seek time, $T_{rl}$ represents rotational latency time, and $T_d$ represents time to read or write one block. In an embodiment of the invention, for LBA ranges that are not physically sequential, a first time metric ($\Delta_5$) may be expressed as:

$$\Delta_5 = \left(n - \sum_{i=1}^{m} n_i\right)T_{df} + \sum_{i=1}^{m}(_iT_{sk} +_i T_{rl} + n_iT_d).$$

In one embodiment, the data-fabrication operations, if any, may be performed underneath the seek and rotational latency times, thereby eliminating the first term in the above expression for the first time metric. In an embodiment, Rotational Positioning Optimization (RPO) sorting may be employed to reduce the total seek and rotational latency times.

In an embodiment, the first time metric provides an adequate basis for comparing different logical ranges having the same size. In one embodiment, for LBA ranges having different logical sizes, a second time metric ($\Delta_6$) is provided by modifying the first time metric. In that embodiment, the second time metric may be expressed as:

$$\Delta_6 = \Delta_5 \left( \sum_{i=1}^{m} n_i \right)^{-1}.$$

Metric Combinations

The fragmentation metrics consider only the impact on the translation table, while the dispersion and time metrics consider the time required to read the physical locations. In one embodiment, although the translation table size and read time are correlated, translation table size may be prioritized over read performance. For example, a fragmentation metric may be used to select a group of segments of the translation table, where each segment corresponds to a range of LBAs, and then a dispersion or time metric may be selected to prioritize the segments in the group. This combination of metrics has the advantage of prioritizing the translation table size reduction and reducing the amount of calculations required for the more expensive metrics, such as the dispersion and time metrics, since they are performed on fewer LBA ranges (i.e., few segments).

Figure 3:
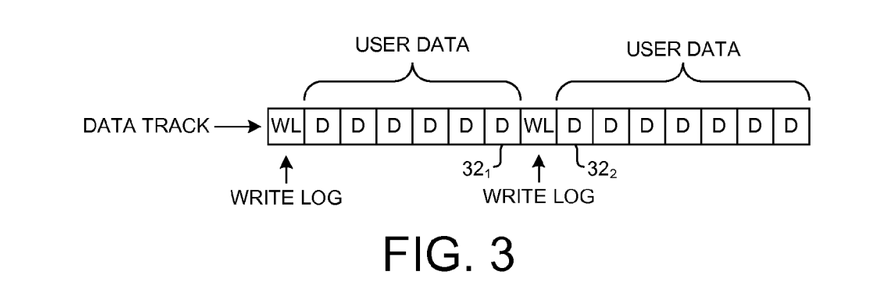
FIG. 3 shows a data track according to an embodiment of the present invention comprising user data and write logs.

FIG. 3 shows an embodiment of the present invention wherein a data track comprises a write log (WL) at the beginning of the track and a write log at the middle of the track. As shown in FIG. 3, user data is stored in physical locations prior to the write log and in physical locations after the write log. In an embodiment wherein cache is turned on by the host, user data from the host is temporarily stored in the cache and then written into the non-volatile media (e.g., one or more data tracks on a disk surface). With cache turned on, write logs are placed between sequences of physical locations containing user data. In the embodiment of the invention shown in FIG. 3, ShABA addressing is employed, wherein a write log does not break the sequence of addresses of the physical locations in a data track. For example, the physical location prior to the write log has address $32_1$ and the physical location after the write log has address $32_2$—the next sequential address. Consequently, in the embodiment of the invention shown in FIG. 3, a write log does not cause a break in run length in the translation table.

Figure 4:
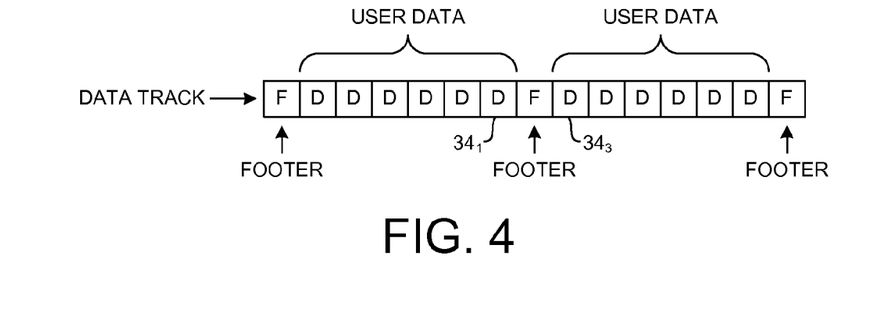
FIG. 4 shows a data track according to an embodiment of the present invention comprising user data and a footer separating the user data.

FIG. 4 shows an embodiment of the present invention wherein a data track comprises a plurality of footers and user data is stored in physical locations between the footers. In an embodiment wherein cache is turned off by the host, a footer is placed in a physical location on a data track after data from each write command has been written to the disk surface. However, each footer causes a break in the sequence of addresses of the physical locations in a data track. As shown in FIG. 4, the physical location prior to the footer near the center of the data track has address $34_1$ and the physical location after the footer has address $34_3$, which is not sequential. Thus, footers break up the run length in the translation table and, consequently, increase the number of translation table entries, thereby increasing fragmentation.

Figure 5:
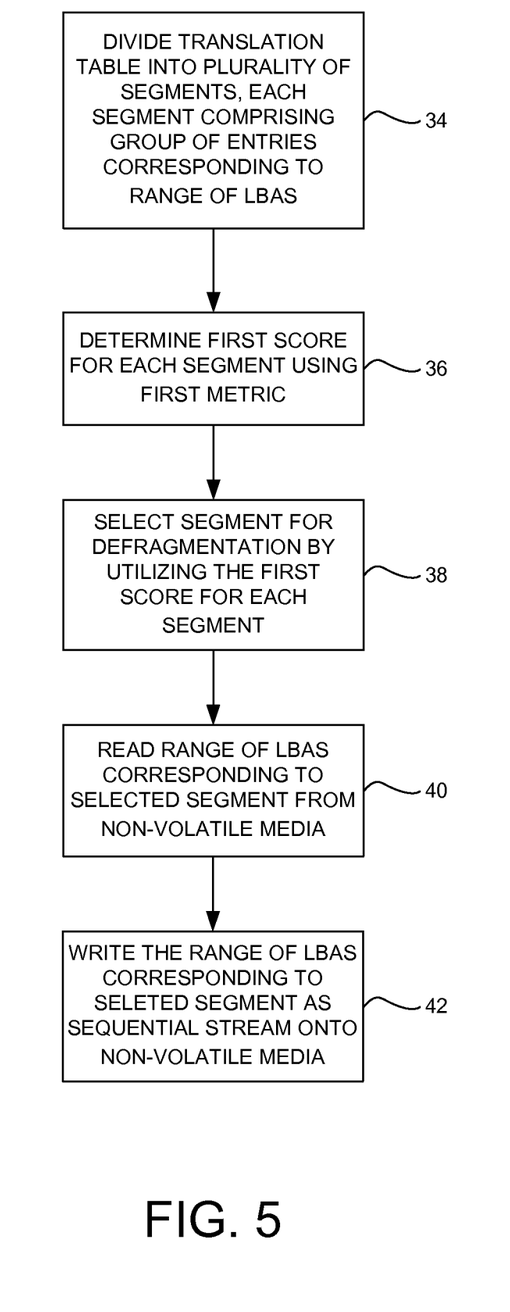
FIG. 5 is a flow diagram according to an embodiment of the present invention wherein a translation table is divided into a plurality of segments and a first score is determined for each segment and used for selecting a segment for defragmentation.

FIG. 5 is a flow diagram executed by the control circuitry 12 according to an embodiment of the present invention, wherein the control circuitry 12 divides a translation table into a plurality of segments, each segment comprising a group of entries corresponding to a range of LBAs (step 34). The control circuitry 12 determines a first score for each segment using a first metric (step 36). For example, the first metric may be a defragmentation metric, wherein the first score indicates the number of entries required to describe the range of LBAs corresponding to the segment. The first metric may be, for example, a dispersion metric, wherein the first score indicates the variance in physical locations corresponding to each entry in the segment. By way of further example, the first metric may be a time metric, wherein the first score indicates the amount of time required to read all of the entries in the segment.

In the embodiment shown in the flow diagram in FIG. 5, the control circuitry 12 selects a segment for defragmentation by utilizing the first score for each segment (step 38). For example, if the first metric is a defragmentation metric, the control circuitry 12 may select the segment for defragmentation having a first score indicating the highest number of entries. If the first metric is a dispersion metric, for example, the control circuitry 12 may select the segment for defragmentation having a first score indicating the lowest variance in physical locations corresponding to each entry. For example, if the first metric is a time metric, the control circuitry 12 may select the segment for defragmentation having a first score indicating the least amount of time required to read all of the entries.

The control circuitry 12 reads the range of LBAs corresponding to the selected segment from non-volatile media (step 40). In an embodiment of the invention, the non-volatile media is a disk surface $4_1$. In one embodiment, the control circuitry 12 reads the range of LBAs from the non-volatile media and writes them into a cache (e.g., SM 30). In the embodiment shown in the flow diagram in FIG. 5, the control circuitry 12 writes the range of LBAs corresponding to the selected segment as a sequential stream onto the non-volatile media (step 42). In an embodiment of the invention, the control circuitry 12 reads the range of LBAs from the cache and writes the range of LBAs as a sequential stream onto a disk surface $4_1$.

Figure 6A:
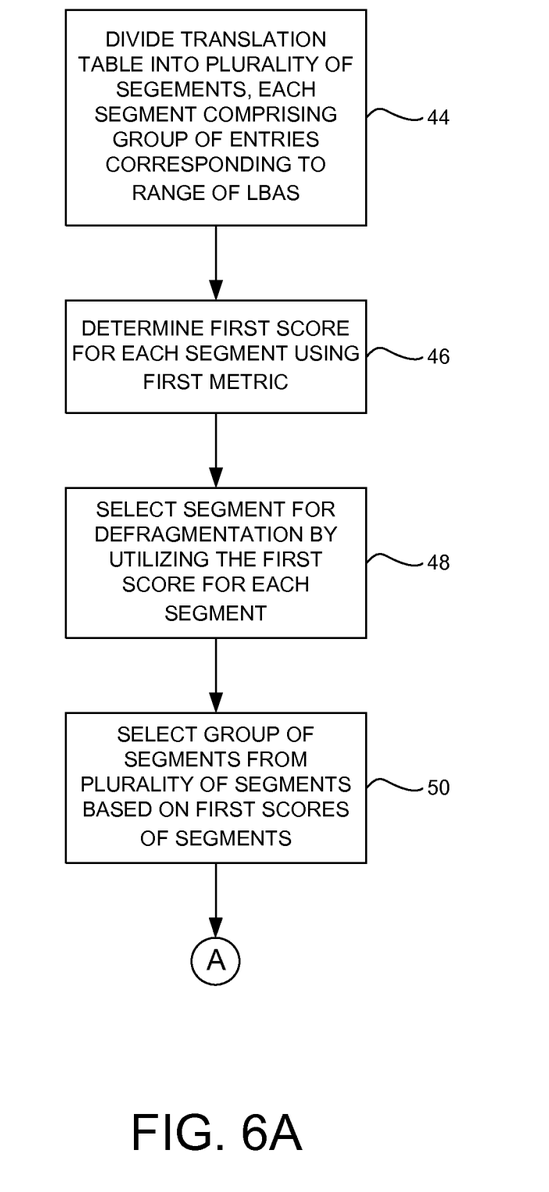
FIG. 6A is a flow diagram according to an embodiment of the present invention wherein a translation table is divided into a plurality of segments, a first score is determined for each segment and used for selecting a segment for defragmentation, and a group of segments is selected based on the first scores.

FIG. 6A is a flow diagram executed by the control circuitry 12 according to an embodiment of the present invention. In the flow diagram in FIG. 6A, the control circuitry 12 divides a translation table into a plurality of segments, each segment comprising a group of entries corresponding to a range of LBAs (step 44), determines a first score for each segment using a first metric (step 46), and selects a segment for defragmentation by utilizing the first score for each segment (step 48). For example, when the first metric is a defragmentation metric, each first score may indicate the number of entries required to describe the LBA range of the segment. For example, when the first metric is another defragmentation metric, each first score may indicate a ratio of total number of LBAs per entry.

In the embodiment shown in the flow diagram in FIG. 6A, the control circuitry 12 selects a group of segments from the plurality of segments based on the first scores of the segments (step 50). For example, when the first metric is a defragmentation metric, the group of segments is selected having the highest first scores, wherein each first score indicates the number of entries required to describe the LBA range of the segment. For example, when the first metric is another defragmentation metric, the group of segments is selected having the lowest first scores, wherein each first score indicates a ratio of total number of LBAs per entry.

Figure 6B:
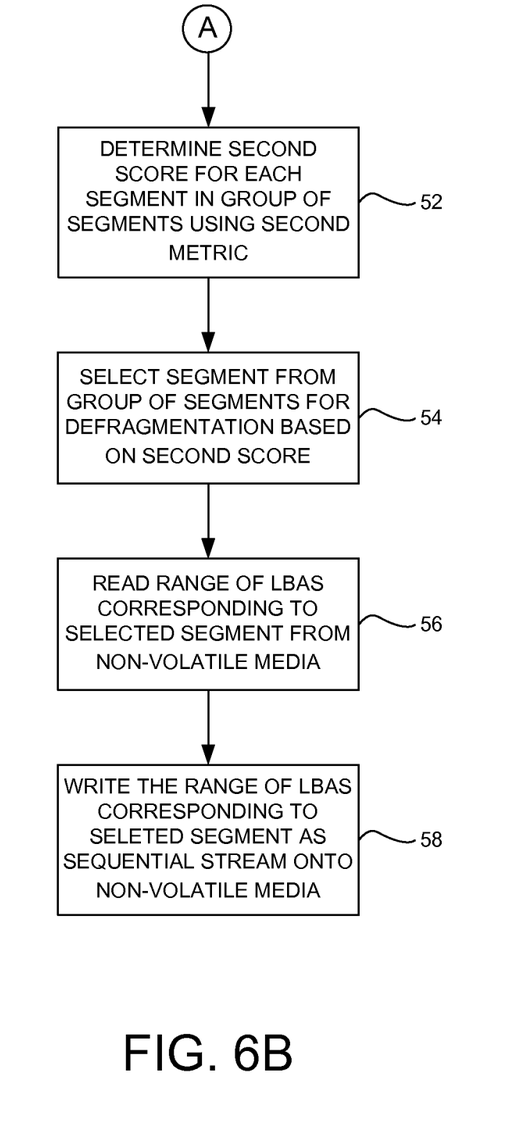
FIG. 6B is a flow diagram according to an embodiment of the present invention wherein a second score is determined for each segment in the group of segments using a second metric and a segment for defragmentation is selected based on the second scores.

FIG. 6B is a flow diagram according to an embodiment of the present invention which extends the flow diagram in FIG. 6A. In the embodiment shown in the flow diagram in FIG. 6B, the control circuitry 12 determines a second score for each segment in group of segments using a second metric (step 52), and selects a segment from the group of segments for defragmentation based on the second scores (step 54). When the second metric is a dispersion metric, for example, the segment having a second score indicating the lowest variance in physical locations corresponding to each entry in the segment may be selected for defragmentation. For example, when the second metric is a time metric, the segment having a second score indicating the least amount of time required to read all the entries in the segment may be selected for defragmentation.

In the embodiment in FIG. 6B, the control circuitry 12 reads the range of LBAs corresponding to the selected segment from the non-volatile media (step 56), and writes the range of LBAs as a sequential stream onto the non-volatile media (step 58). In an embodiment of the invention, the non-volatile media is a disk surface $4_1$. In an embodiment, the LBAs are read from the non-volatile media into a cache (e.g., SM 30) and written from the cache as a sequential stream onto the non-volatile media.

Figure 7:
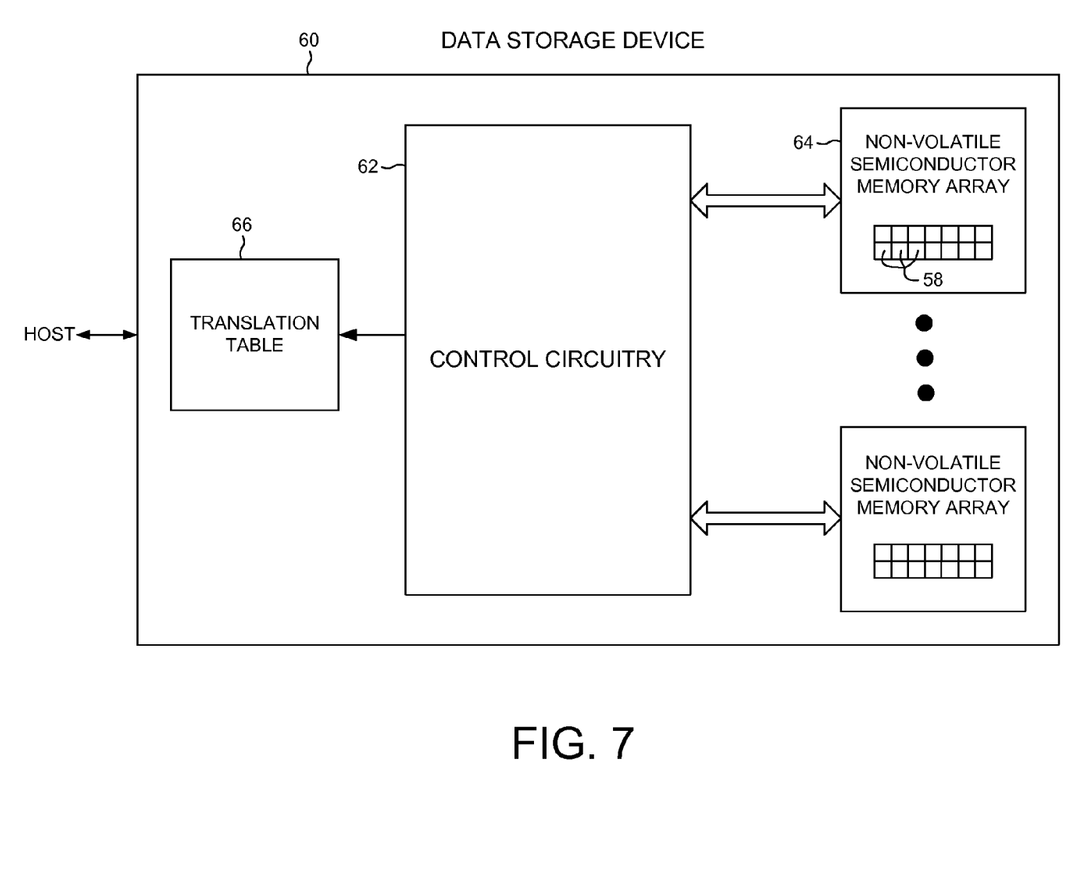
FIG. 7 shows a data storage device according to an embodiment of the present invention comprising control circuitry, a translation table, and non-volatile semiconductor memory array comprising a plurality of physical locations for storing user data.

FIG. 7 shows a solid state memory-based data storage device 60 according to an embodiment of the present invention comprising control circuitry 62, non-volatile semiconductor memory (NVSM) array 64, and translation table 66. As shown in FIG. 7, the control circuitry 62 is in communication with NVSM array 64, which comprises a plurality of physical locations 68 that can be used by the host for reading and writing data. In one embodiment, the NVSM array 64 comprises flash memory. The translation table 66 in the embodiment of the invention in FIG. 7 is similar in structure and functionality to the translation table shown in the embodiment of the invention in FIG. 1D.

In the embodiment in FIG. 7, the control circuitry 62 is operable to execute at least some of the steps in the flow charts in the embodiments of the invention in FIG. 1B, FIG. 5, FIG. 6A, and FIG. 6B. In one embodiment of the invention, the control circuitry 62 is operable to divide a translation table 66 into a plurality of segments, each segment comprising a group of entries corresponding to a range of LBAs, determine a first score for each segment using a first metric, and select a segment for defragmentation by utilizing the first score for each segment. In an embodiment of the invention, the first metric is a fragmentation metric, wherein defragmenting the selected segment causes the translation table 66 to be reduced in size.

It is noted that the steps in the flow diagrams in FIGS. 1B, 5, 6A and 6B are shown in a particular order to illustrate respective embodiments of the invention. In other embodiments, the steps in the flow diagrams in FIGS. 1B, 5, 6A and 6B may be performed in a different order.

Any suitable control circuitry may be employed in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on a disk surface and read into a volatile semiconductor memory when the disk drive is powered on. In yet another embodiment, the control circuitry comprises suitable logic circuitry, such as state machine circuitry.

What is claimed is:

1. A data storage device comprising:
   a non-volatile media comprising a plurality of physical locations for storing user data, each physical location associated with a logical block address (LBA);
   a translation table comprising a plurality of entries, each entry comprising a mapping of one or more LBAs to a corresponding number of physical locations on the non-volatile media; and
   control circuitry operable to:
      divide the translation table into a plurality of segments based on a first LBA and a last LBA greater than the first LBA per segment, each segment comprising a group of entries corresponding to a range of LBAs extending from a first LBA to a last LBA for the segment;
      determine a first score for each segment using a first metric; and
      select a segment for defragmentation by utilizing the first score for each segment.

2. The data storage device as recited in claim 1, wherein the control circuitry is further operable to:
   read the range of LBAs corresponding to the selected segment on the non-volatile media; and
   write the range of LBAs corresponding to the selected segment as a sequential stream on the non-volatile media.

3. The data storage device as recited in claim 1, wherein the first metric is a fragmentation metric, and the control circuitry is further operable to select the segment for defragmentation having a first score indicating the highest number of entries required to describe the range of LBAs corresponding to the segment.

4. The data storage device as recited in claim 1, wherein the first metric is a fragmentation metric, and the control circuitry is further operable to select the segment for defragmentation having a first score indicating the lowest ratio of total number of LBAs per entry.

5. The data storage device as recited in claim 1, wherein the first metric is a dispersion metric, and the control circuitry is further operable to select the segment for defragmentation having a first score indicating the lowest variance in physical locations corresponding to each entry in the segment.

6. The data storage device as recited in claim 1, wherein the first metric is a time metric, and the control circuitry is further operable to select the segment for defragmentation having a first score indicating the least amount of time required to read all of the entries in the segment.

7. The data storage device as recited in claim 1, wherein the control circuitry is further operable to:
   select a group of segments from the plurality of segments based on the first scores of the segments;
   determine a second score for each segment in the group of segments using a second metric; and
   select a segment from the group of segments for defragmentation based on the second score for each segment in the group of segments.

8. The data storage device as recited in claim 7, wherein the first metric is a fragmentation metric and the second metric is a dispersion metric, and the control circuitry is further operable to:
   select the group of segments having the highest first scores, wherein each first score indicates the number of entries required to describe the LBA range of the segment; and select a segment from the group of segments for defragmentation having a second score indicating the lowest variance in physical locations corresponding to each entry in the segment.

9. The data storage device as recited in claim 7, wherein the first metric is a fragmentation metric and the second metric is a dispersion metric, and the control circuitry is further operable to:
- select the group of segments having the lowest first scores, wherein each first score indicates a ratio of total number of LBAs per entry; and
- select a segment from the group of segments for defragmentation having a second score indicating the lowest variance in physical locations corresponding to each entry in the segment.

10. The data storage device as recited in claim 7, wherein the first metric is a fragmentation metric and the second metric is a time metric, and the control circuitry is further operable to:
- select the group of segments having the highest first scores, wherein each first score indicates the number of entries required to describe the LBA range of the segment; and
- select a segment from the group of segments for defragmentation having a second score indicating the least amount of time required to read all of the entries in the segment.

11. The data storage device as recited in claim 7, wherein the first metric is a fragmentation metric and the second metric is a time metric, and the control circuitry is further operable to:
- select the group of segments having the lowest first scores, wherein each first score indicates a ratio of total number of LBAs per entry; and
- select a segment from the group of segments for defragmentation having a second score indicating the least amount of time required to read all entries in the segment.

12. The data storage device as recited in claim 1, wherein the non-volatile media comprises a disk having a plurality of tracks including the plurality of physical locations for storing the user data.

13. The data storage device as recited in claim 12, wherein the plurality of tracks are written on the disk in a shingled manner such that each track is partially overwritten when an immediately contiguous track is written.

14. The data storage device as recited in claim 1, wherein the non-volatile media comprises a non-volatile semiconductor media including the plurality of physical locations for storing the user data.

15. A method of operating a data storage device, the data storage device comprising a non-volatile media comprising a plurality of physical locations for storing user data, each physical location associated with a logical block address (LBA), and a translation table comprising a plurality of entries, each entry comprising a mapping of one or more LBAs to a corresponding number of physical locations on the non-volatile media, the method comprising:
- dividing the translation table into a plurality of segments based on a first LBA and a last LBA greater than the first LBA per segment, each segment comprising a group of entries corresponding to a range of LBAs extending from a first LBA to a last LBA for the segment;
- determining a first score for each segment using a first metric; and
- selecting a segment for defragmentation by using the first score for each segment.

16. The method as recited in claim 15, further comprising:
- reading the range of LBAs corresponding to the selected segment on the non-volatile media; and
- writing the range of LBAs corresponding to the selected segment as a sequential stream on the non-volatile media.

17. The method as recited in claim 15, wherein:
the first metric is a fragmentation metric; and
further comprising selecting the segment for defragmentation having a first score indicating the highest number of entries required to describe the range of LBAs corresponding to the segment.

18. The method as recited in claim 15, wherein:
the first metric is a fragmentation metric; and
further comprising selecting the segment for defragmentation having a first score indicating the lowest ratio of total number of LBAs per entry.

19. The method as recited in claim 15, wherein:
the first metric is a dispersion metric; and
further comprising selecting the segment for defragmentation having a first score indicating the lowest variance in physical locations corresponding to each entry in the segment.

20. The method as recited in claim 15, wherein:
the first metric is a time metric; and
further comprising selecting the segment for defragmentation having a first score indicating the least amount of time required to read all of the entries in the segment.

21. The method as recited in claim 15, further comprising:
- selecting a group of segments from the plurality of segments based on the first scores of the segments;
- determining a second score for each segment in the group of segments using a second metric; and
- selecting a segment from the group of segments for defragmentation based on the second score for each segment in the group of segments.

22. The method as recited in claim 21, wherein:
the first metric is a fragmentation metric and the second metric is a dispersion metric; and
further comprising:
- selecting the group of segments having the highest first scores, wherein each first score indicates the number of entries required to describe the LBA range of the segment; and
- selecting a segment from the group of segments for defragmentation having a second score indicating the lowest variance in physical locations corresponding to each entry in the segment.

23. The method as recited in claim 21, wherein:
the first metric is a fragmentation metric and the second metric is a dispersion metric; and
further comprising:
- selecting the group of segments having the lowest first scores, wherein each first score indicates a ratio of total number of LBAs per entry; and
- selecting a segment from the group of segments for defragmentation having a second score indicating the lowest variance in physical locations corresponding to each entry in the segment.

24. The method as recited in claim 21, wherein:
the first metric is a fragmentation metric and the second metric is a time metric; and
further comprising:
- selecting the group of segments having the highest first scores, wherein each first score indicates the number of entries required to describe the LBA range of the segment; and selecting a segment from the group of segments for defragmentation having a second score indicating the least amount of time required to read all of the entries in the segment.

25. The method as recited in claim 21, wherein:
the first metric is a fragmentation metric and the second metric is a time metric; and
further comprising:
   selecting the group of segments having the lowest first scores, wherein each first score indicates a ratio of total number of LBAs per entry; and
   selecting a segment from the group of segments for defragmentation having a second score indicating the least amount of time required to read all of the entries in the segment.

26. The method as recited in claim 15, wherein the non-volatile media comprises a disk having a plurality of tracks including the plurality of physical locations for storing the user data.

27. The method as recited in claim 26, wherein the plurality of tracks are written on the disk in a shingled manner such that each track is partially overwritten when an immediately contiguous track is written.

28. The method as recited in claim 15, wherein the non-volatile media comprises a non-volatile semiconductor media including the plurality of physical locations for storing the user data.

* * * * *